US012314188B2

United States Patent
Kumar et al.

(10) Patent No.: US 12,314,188 B2
(45) Date of Patent: May 27, 2025

(54) PLATFORM DATA AGING FOR ADAPTIVE MEMORY SCALING

(71) Applicant: Intel Corporation, Santa Clara, CA (US)

(72) Inventors: Karthik Kumar, Chandler, AZ (US); Francesc Guim Bernat, Barcelona (ES); Mark A Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 17/357,662

(22) Filed: Jun. 24, 2021

(65) Prior Publication Data

US 2021/0318965 A1    Oct. 14, 2021

(51) Int. Cl.
*G06F 12/12* (2016.01)
*G06F 1/3234* (2019.01)
*G06F 12/02* (2006.01)
*G06F 12/123* (2016.01)
*G06F 12/14* (2006.01)

(52) U.S. Cl.
CPC .......... *G06F 12/123* (2013.01); *G06F 1/3275* (2013.01); *G06F 12/023* (2013.01); *G06F 12/1466* (2013.01); *G06F 2212/1052* (2013.01)

(58) Field of Classification Search
CPC ........ G06F 12/00; G06F 12/12; G06F 12/123; G06F 1/3275; G06F 12/023; G06F 12/1466; G06F 2212/1052; G06F 12/02
See application file for complete search history.

(56) References Cited

U.S. PATENT DOCUMENTS 9,547,361 B2    1/2017    Taha et al.
9,715,933 B2    7/2017    Hsu
(Continued)

FOREIGN PATENT DOCUMENTS

WO    WO-2008127683 A1 *  10/2008    ............ H04W 84/18
WO    2022271231            12/2022

OTHER PUBLICATIONS

D. K.-H. Yu and J.-W. Hsieh, "Retention-Time Relaxation Scheme for MLC Flash-Memory Storage Systems," 2018 IEEE 24th International Conference on Embedded and Real-Time Computing Systems and Applications (RTCSA), Hakodate, Japan, 2018, pp. 42-51.*
(Continued)

*Primary Examiner* — Pierre Michel Bataille
(74) *Attorney, Agent, or Firm* — Schwegman Lundberg & Woessner, P.A.

(57) ABSTRACT

The platform data aging for adaptive memory scaling described herein provides technical solutions for technical problems facing power management for electronic device processors. Technical solutions described herein include improved processor power management based on a memory region life-cycle (e.g., short-lived, long-lived, static). In an example, a short-term memory request is allocated to a short-term memory region, and that short-term memory region is powered down upon expiration of the lifetime of all short-term memory requests on the short-term memory region. Multiple memory regions may be scaled down (e.g., shut down) or scaled up based on demands for memory capacity and bandwidth.

25 Claims, 10 Drawing Sheets

(56) References Cited

U.S. PATENT DOCUMENTS

| | | | |
|---|---|---|---|
| 11,093,408 B1* | 8/2021 | Solganik | G06F 12/0269 |
| 2005/0193173 A1 | 9/2005 | Ring et al. | |
| 2006/0181949 A1 | 8/2006 | Kini | |
| 2017/0242625 A1 | 8/2017 | Pandurangan et al. | |
| 2020/0097215 A1* | 3/2020 | Bazarsky | G06F 3/0649 |
| 2020/0387448 A1* | 12/2020 | Thomasson | G06F 3/0604 |

OTHER PUBLICATIONS

A. Acquaviva, E. Lattanzi and A. Bogliolo, "Power-aware network swapping for wireless palmtop PCs," in IEEE Transactions on Mobile Computing, vol. 5, No. 5, pp. 571-582, May 2006.*

"International Application Serial No. PCT US2022 021350, International Preliminary Report on Patentability mailed Jan. 4, 2024", 7 pgs.

"International Application Serial No. PCT US2022 021350, International Search Report mailed Jun. 24, 2022", 4 pgs.

"International Application Serial No. PCT US2022 021350, Written Opinion mailed Jun. 24, 2022", 4 pgs.

* cited by examiner

PLATFORM DATA AGING FOR ADAPTIVE MEMORY SCALING

TECHNICAL FIELD

Embodiments described herein relate to electronic device processor power management.

BACKGROUND

In recent years, there has been an increased focus on power management for electronic device processors. This is due in part to a continued growth in compute requirements (e.g., increased processor speed), combined with a reduction in the rate of process scaling (e.g., smaller increases in processor speed). One measure of processor power management includes Thermal Design Power (TDP), which indicates the power consumption in watts by a processor under a maximum theoretical processing load. Some exiting multiple-core CPU computing systems have an associated TDP in the range of 270-300 W or more. Power management is also an operational expenditure (opex) consideration for cloud computing, such as SAP Cloud, IBM Cloud, Azure, and other cloud computing.

One of the major contributors to overall power consumption is the memory subsystem. For example, for a CPU that consumes 200-300 W, a fully populated memory system whose dynamic random-access memory (DRAM) includes 16 dual in-line memory modules (DIMMs) can consume 150-200 W. Configurations that include higher-speed interconnects such as Compute Express Link (CXL) slots with additional memory may draw an additional 100 W, depending on the type of memory or drive. What is needed is an improved solution for power management for electronic device processors.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The subject matter described herein provides technical solutions for technical problems facing power management for electronic device processors. Technical solutions described herein include improved processor power management based on a memory region life-cycle (e.g., short-lived, long-lived, static). In an example, a short-term memory request is allocated to a short-term memory region, and that short-term memory region is powered down upon expiration of the lifetime of all short-term memory requests on the short-term memory region. Multiple memory regions may be scaled down (e.g., shut down) or scaled up based on demands for memory capacity and bandwidth. The memory power management techniques may be implemented for local memory devices, remote processing memory devices (e.g., cloud computing memory devices, edge computing memory devices (e.g., memory devices at the edge of a computing network), and at various physical and logical locations throughout the edge or cloud networks.

In the following description, for purposes of explanation, numerous specific details are set forth in order to provide a thorough understanding of some example embodiments. It will be evident, however, to one skilled in the art that the present disclosure may be practiced without these specific details.

Figure 1:
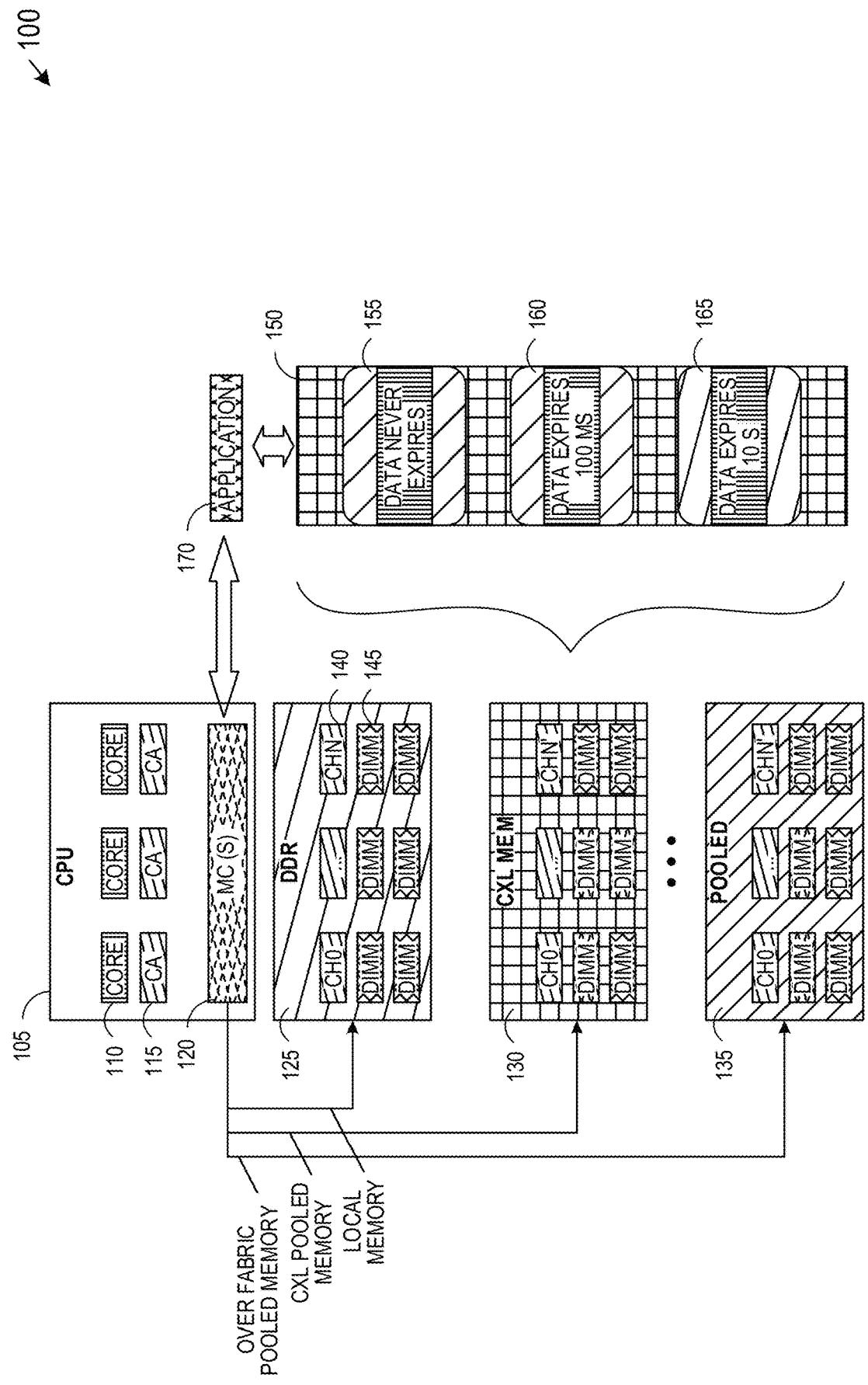
FIG. 1 is a schematic drawing illustrating a first life-cycle based memory architecture, according to an embodiment.

FIG. 1 is a schematic drawing illustrating a first life-cycle based memory architecture 100, according to an embodiment. Architecture 100 includes a CPU 105, which includes one or more processing cores 110, one or more cache agents 115, and one or more memory controllers 120. The memory controllers 120 may be connected to one or more memory types, including local double data rate (DDR) RAM 125, CXL pooled memory 130, over-fabric pooled memory 135, cloud computing memory, edge computing memory, or other memory type. Each memory type may include one or more memory channels 140, which may be associated with one or more memory devices 145 (e.g., RAM DIMMs, CXL drives). Each memory type may allocate groups of one or more memory channels 140 into a life-cycle memory region mapping 150. Memory region mapping 150 may include various life-cycle regions, such as a static memory region 155 for data that never expires, a short-lived memory region 160 for data that expires within 100 ms, and a long-lived memory region 165 for data that expires within 10 s (e.g., expires between 100 ms and 10 s).

In operation, when serving a memory request, the memory controllers 120 expose the life-cycle of each memory request to a software application stack 170, which may allocate memory objects into the appropriate memory regions. When all data within the short-lived memory region 160 has expired, one or more of the memory channels 140 and multiple memory devices 145 associated with the short-lived memory region 160 may be shut down (e.g., scaled down). By scaling down the multiple memory devices 145 while retaining unexpired memory in the remaining static memory region 155 and longer-lived memory region 165, power consumption may be reduced significantly without adversely affecting memory capacity and bandwidth.

The determination of when to scale down or scale up the multiple memory devices 145 may be in response to a reduced power budget (e.g., low power request) or in response to a low bandwidth demand. In an example, instead of interleaving a memory object across all available memory devices 145 and slots for maximum bandwidth, the memory object may be interleaved across most memory devices 145 other than the short-lived memory region 160, thereby providing sufficiently high bandwidth while reducing power when the short-lived memory region 160 is powered down. The determination of when to scale down or scale up the multiple memory devices 145 may be based on predicted demands for memory capacity and bandwidth, where the predicted memory demands may be determined by a demand activity predictor. The determination of when to scale down or scale up the multiple memory devices 145 may be based on a custom trigger, where the custom trigger may include a detection of an ambient temperature increasing above an ambient temperature threshold, a detection of when a variable in the current memory region or another memory region changes from a current value or changes to a predetermined value, a detection of a change in the configuration of the computing system (e.g., a memory device is removed), or another custom trigger. The determination of when to scale down or scale up the multiple memory devices 145 may be based further on a guaranteed minimum service level, such as a minimum service level guaranteed by a cloud computing or edge computing service level agreement (SLA). In an example, the software application stack 170 may expose an application programming interface (API) quality of service (QoS) hook (e.g., API function call) to provide a predetermined memory region service level.

Architecture 100 provides various technical advantages for memory power management. By exposing the life-cycle of each memory request to the software application stack 170, architecture 100 is able to scale memory down or up as needed. By scaling down memory devices based on memory region life-cycle, architecture 100 is able to provide sufficient memory bandwidth while reducing or eliminating unneeded power consumption from memory requests. When memory is interleaved across multiple RAM devices to improve bandwidth, architecture 100 provides the ability to scale down RAM devices without requiring additional time and power consumption associated with reallocating memory within the RAM devices, such as moving memory and correcting any holes in the memory address map. Architecture 100 also provides improved performance for increasingly modular applications (e.g., microservices, function-as-a-service (FAAS)).

Figure 2:
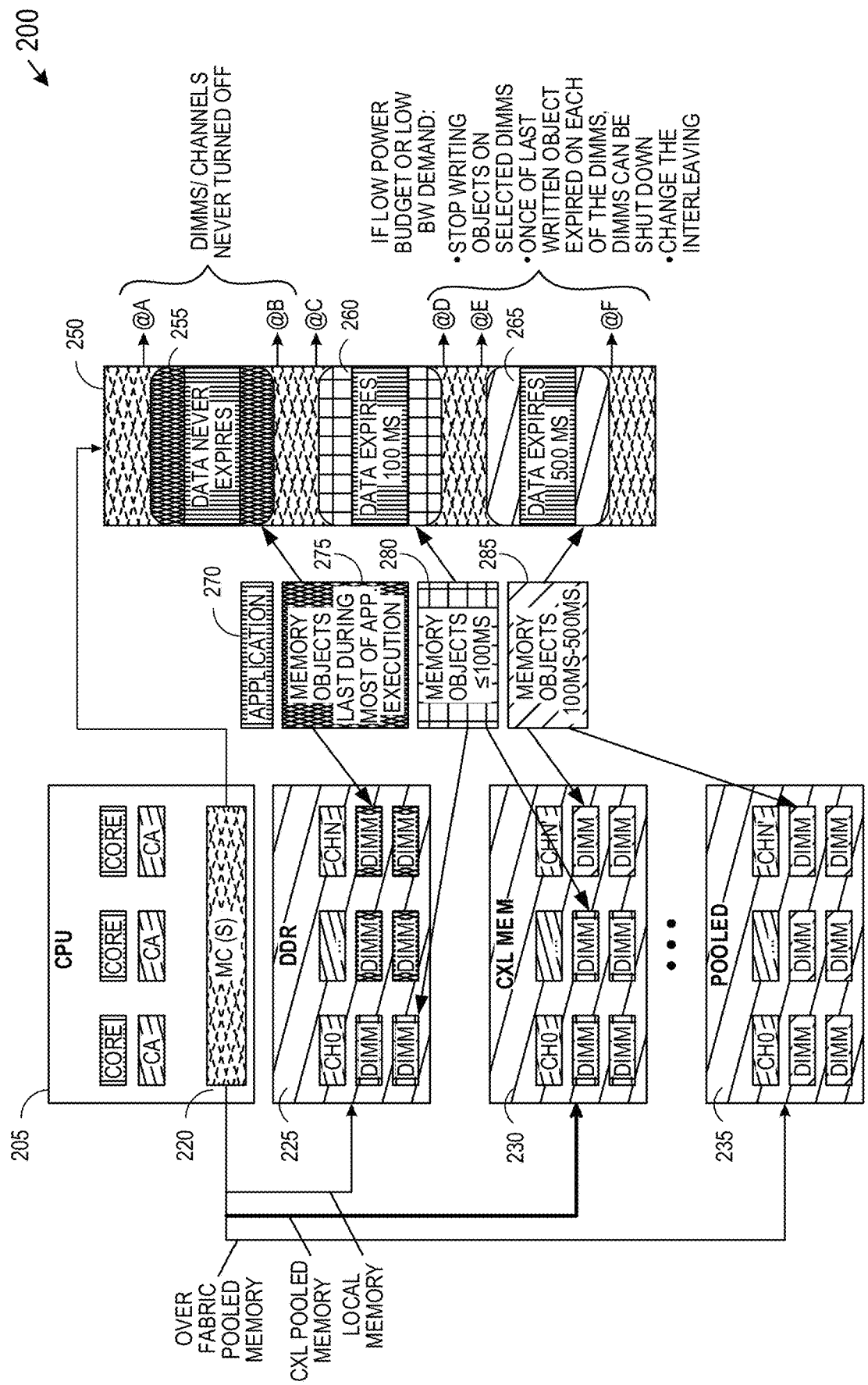
FIG. 2 is a schematic drawing illustrating a second life-cycle based memory architecture, according to an embodiment.

FIG. 2 is a schematic drawing illustrating a second life-cycle based memory architecture 200, according to an embodiment. Architecture 200 provides additional detail regarding how life-cycle information provided by the software application stack 270 may be used to implement memory scaling, thereby providing reduced power consumption and increased system efficiency. The CPU 205 and an operating system (OS) running on the CPU may be used to expose new interfaces (e.g., API function calls) that allow software applications to identify different memory ranges that have been allocated to store memory objects with a predetermined lifetime range. In an example, static memory objects 275 that last during most or all of an application execution may be allocated to a static memory region 255 for data that never expires, short-lived memory objects 280 that expire within 100 ms may be allocated to a short-lived memory region 260, and long-lived memory objects 285 that expire between 100 ms and 500 ms may be allocated to a long-lived memory region 265. In this example, static memory region 255 may be assigned memory a memory range from memory location @A to memory location @B, short-lived memory region 260 may be assigned memory a memory range from memory location @C to memory location @C, and long-lived memory region 265 may be assigned memory a memory range from memory location @E to memory location @F. Memory regions may be adjacent to each other or may include one or more interstitial padding memory regions.

The memory expiration ranges may be configurable by the platform owner and adaptable depending on the domain, such as being reconfigured for different durations, to span different ranges of memory within a memory subsystem, or to use one or more memory subsystems. In an example, static memory objects 275 may be allocated to one or more DIMMs within DDR RAM 225, short-lived memory objects 280 may be allocated to one or more DIMMs within DDR RAM 225 and CXL pooled memory 230, and long-lived memory objects 285 may be allocated to one or more DIMMs within CXL pooled memory 230 and over-fabric pooled memory 235. Other combinations of memory may be used, and memory objects may be distributed among one or more of DDR RAM 125, CXL pooled memory 130, over-fabric pooled memory 135, cloud computing memory, edge computing memory, or other memory.

The CPU 205 and OS running on the CPU may be used to allocate memory objects based on performance requests, minimum performance requirements (e.g., bandwidth, latency) guaranteed in an SLA, and other performance considerations. The memory controller 220 may be used to monitor observed and predicted processing load and minimum performance requirements provided in an SLA, and the memory controller 220 may shut down some of the DIMMS or memory channels on a particular memory tier based on memory object lifetime duration. In an example, in response to a low power budget or a low bandwidth demand, the memory controller 220 may stop writing memory objects within the short-lived memory region 260, change interleaving of new memory objects to be written to the long-lived memory region 265, and may shut down the short-lived memory region 260 upon expiration of the last written short-lived memory object 280.

Figure 3:
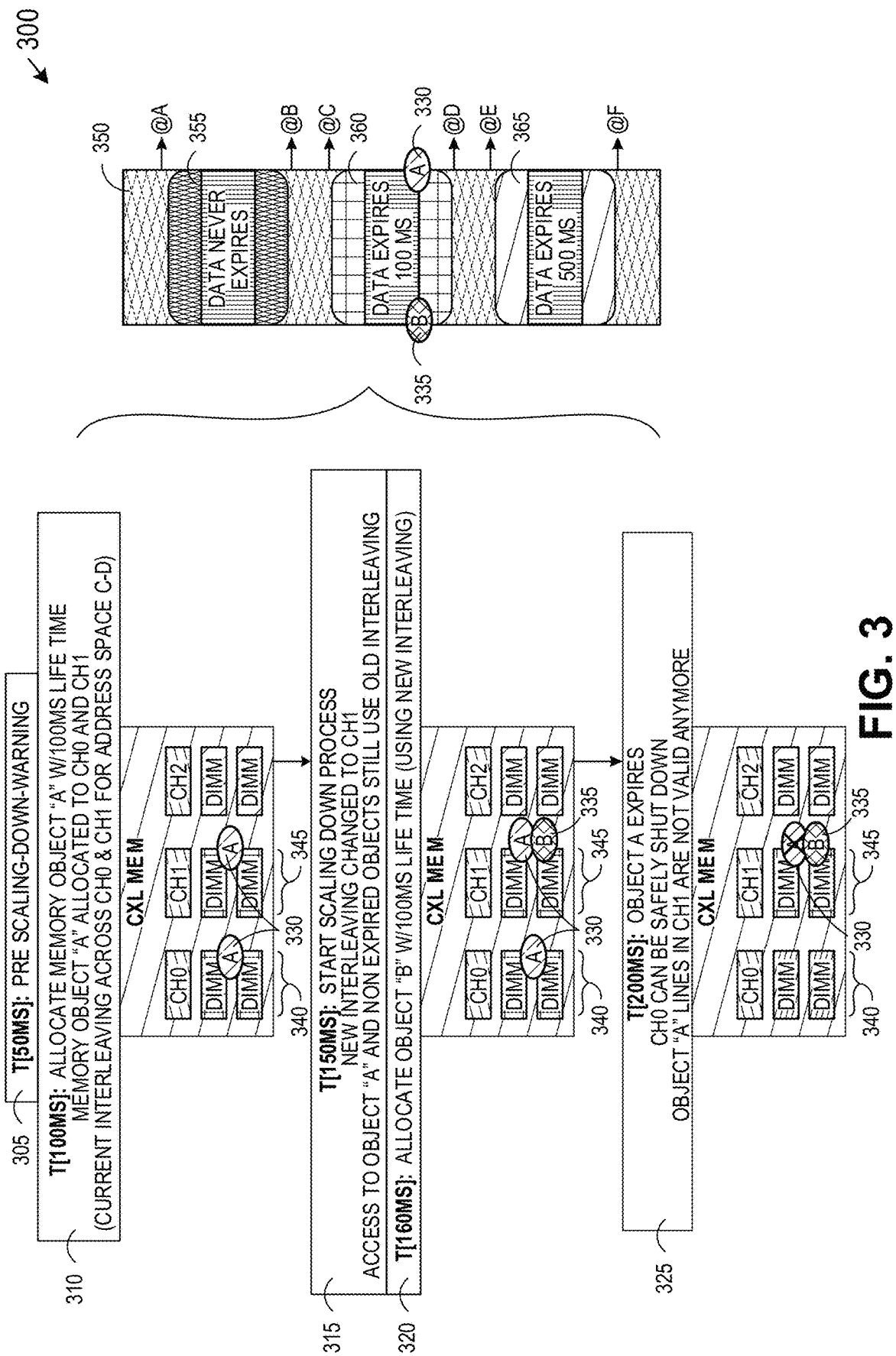
FIG. 3 is a schematic drawing illustrating a memory scaling process 300, according to an embodiment.

FIG. 3 is a schematic drawing illustrating a memory scaling process 300, according to an embodiment. The memory scaling process 300 provides an example of tracking memory objects, interleaving memory objects across memory devices, and shutting down memory devices based on exploration of a last written short-lived memory object. In this example, memory region mapping 350 a static memory region 355 for data that never expires, a short-lived memory region 360 for data that expires within 100 ms, and a long-lived memory region 365 for data that expires within 500 ms (e.g., expires between 100 ms and 500 ms). The memory scaling process 300 may be initiated in response to a pre-scaling-down warning, and may include tracking the life-cycle of memory objects that are being written to any of the memory devices that will be shut down. Once the scaling down process starts, the CPU cache addresser may use a set of filtering rules (e.g., within a system address decoder (SAD)) to provide interleaving for memory objects that are not predicted to expire.

In the example shown in FIG. 3, at a first time 305 (e.g., T=50 ms), the memory scaling process 300 may receive a pre-scaling-down warning. At a second time 310 (e.g., T=100 ms), memory object A 330 that is associated with a 100 ms lifetime may be stored within short-lived memory region 360, such as interleaved across CH0 memory devices 340 and CH1 memory devices 345. At a third time 315 (e.g., T=150 ms), the scaling down process begins. During this scaling down process, the previous interleaving across CH0 memory devices 340 and CH1 memory devices 345 is maintained for memory object A 330 and for other non-expired memory objects, but interleaving for new memory objects is changed to use only CH1 memory devices 345. At a fourth time 320 (e.g., T=160 ms), new memory object B 335 uses the revised interleaving, and allocates new memory object B 335 to use only CH1 memory devices 345. At a fifth time 325 (e.g., T=200 ms), memory object A 330 expires, CH0 memory devices 340 may be shut down, and lines in CH1 memory devices 345 previously used for memory object A 330 may be freed for use by other memory objects.

Figure 4:
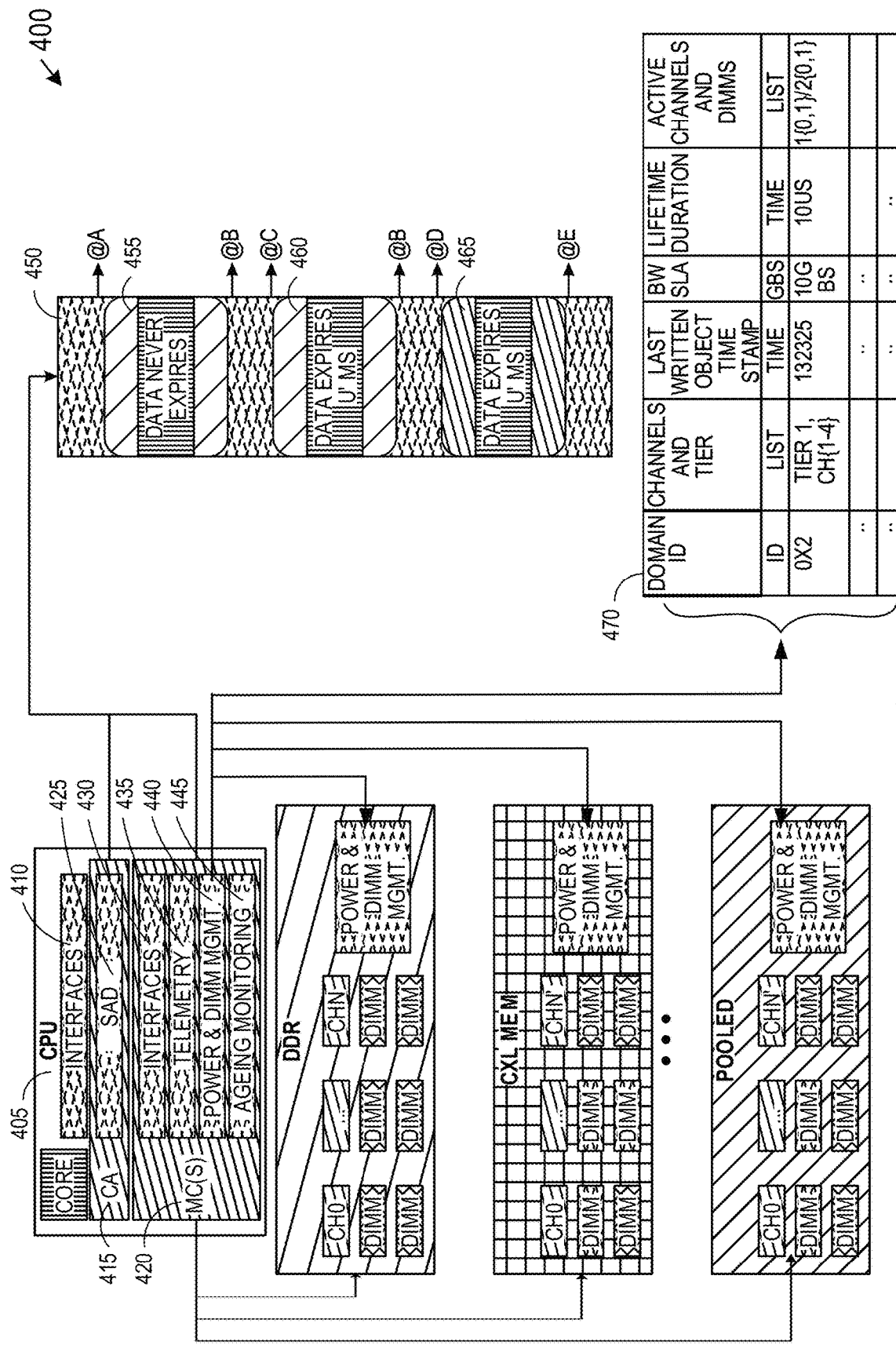
FIG. 4 is a schematic drawing illustrating a third life-cycle based memory architecture, according to an embodiment.

FIG. 4 is a schematic drawing illustrating a third life-cycle based memory architecture 400, according to an embodiment. Architecture 400 provides additional details regarding the components within the CPU 405 that may use memory object lifetimes to implement memory scaling. A CPU interface 410 may be include various sub-interfaces, which may be implemented as separate groups of API calls. A first sub-interface may be used to configure various memory tiers 450 and the types of memory that each is hosting. The memory tiers 450 may include various life-cycle regions, such as a static memory region 455, a short-lived memory region 460, and a long-lived memory region 465. The first sub-interface may be used to specify a domain ID, which may be used to identify a specific aging configuration, such as the expiration times associated with each of the memory tiers 450. The first sub-interface may be used to specify a memory tier (e.g., DRAM), which may be identified by a global ID. The first sub-interface may be used to specify a list of memory channels and an aging of the data that is hosted in one or more of the memory tiers. In an example, this data aging may include a timestamp that may be specified with an integer value (e.g., 10, 100) and a metric that represents the units for a value (e.g., μs, ms). The first sub-interface may be used to specify an SLA that may be associated with the tier, where the SLA may be used to define a minimum amount of memory bandwidth that the tier is guaranteed to provide per the SLA.

A second sub-interface may be used to allow modification of the parameters used by the first sub-interface, such as to provide an indication that a parameter change will be requested in the next N units of time. In an example, an indication may be provided that a memory tier will be required to scale the memory bandwidth by 10% within 500 ms, and that the lifetime duration of the memory objects will be updated 10 ms to 100 ms. The first sub-interface and the second sub-interface may be accessed by the OS kernel (e.g., protection domain Ring 0).

A third sub-interface may be used to allow applications to discover available memory tiers and determine how they are configured. Similar to the first sub-interface, this third sub-interface may return a list of memory tiers with memory tier configuration information. The configuration information may identify the memory address space, which may be abstracted by the OS to the application. In an example, the memory address space may be exposed to applications as a sub-non-uniform memory access (sub-NUMA) domain, and each sub-NUMA domain may be mapped into a memory tier. The configuration information may identify the aging of the memory data that is hosted in each sub-NUMA domain. The configuration information may also identify an SLA that may be associated with the memory tier, which may be used to indicate a minimum amount of memory bandwidth that the memory tier is to provide per the SLA.

A fourth sub-interface to applications may be used to allocate memory objects or memory chunks, such as within a sub-NUMA domain. This fourth sub-interface may be used to specify a sub-NUMA domain from the perspective of the OS, such as the CPU exposing the sub-NUMA domain to the OS as an address space. The fourth sub-interface may be used to specify an SLA associated with one or more memory objects or memory ranges.

A fifth sub-interface to one or more memory controllers 420 may be used to indicate to the cache agents 415 which of the memory channels will be scaled up or scaled down (e.g., turned on or off). Using this fifth sub-interface, the CPU 405 can stop sending requests to specific memory channels once the memory architecture indicates an intention to shut down a memory channel for a particular memory tier. The fifth sub-interface may be used to specify memory channel that is affected, which scaling memory operation is to occur (e.g., scaling down, scaling up), and when the scaling memory operation is to occur (e.g., 100 μs).

The CPU 405 includes new logic that implements these sub-interfaces and services memory requests from the OS. In response to a requested change for a memory channel of a particular memory tier, this logic may be used to propagate the memory configuration to a system address decoder (SAD) 425 within the cache agent 415. In response, the SAD 425 may change the interleaving policy for that memory tier in order to accommodate the requested change. This logic may also be used to monitor applications that are being executed in the platform that may not be provided sufficient memory bandwidth, such as when no SLA is provided or when there are problems with allocating memory objects associated with a particular Domain ID.

The memory controller 420 may be expanded to include a set of components that implement the features described herein. In an example, the memory controller 420 may be expanded to include a set of memory controller interfaces 430 that may be used by the CPU 405 to implement creation and management of the Domain ID, such as one or more sub-interfaces to create, update, or delete a domain based on the Domain ID. The memory controller interfaces 430 may be used by the CPU 405 to provide configuration changes, such as configuration changes based on the Domain ID, the memory tier ID, a list of memory channels, a list of active memory channels and memory DIMMS, and an SLA.

The memory controller interfaces 430 may provide access to an aging monitor 445 for each of the created domains. This aging monitor 445 may be used to track and update multiple raw entries with the last memory object stored for each DIMM in a particular domain, with a bandwidth observed during a previous N units of time, or with predicted bandwidth utilization in the next M units of time. The aging monitor 445 may include a demand activity predictor that may predict demands for memory capacity and bandwidth, such as by using long short-term memory (LSTM) models or other bandwidth modeling tools to predict potential bandwidth requirement spikes.

The memory controller interfaces 430 may provide access to power management logic 440 that may be used to deactivate or activate memory channels. The power management logic 440 may be used to monitor bandwidth utilization and bandwidth prediction, such as using LSTM models or other bandwidth modeling tools. When there is an opportunity to shut down memory channels, the power management logic 440 may identify a number of memory channels and DIMMS that may be shut down without affecting a current bandwidth demand, while still satisfying a service-level objective (SLO) or other service level requirement within an SLA. For each memory channel that has been identified as a memory channel to be shut down, the power management logic 440 may connect to a cache agent 415 to prevent allocating future memory objects to the identified memory channel. The power management logic 440 may generate a system interrupt to indicate to the OS that a particular DIMM or memory channel has been deactivated. Because the deactivation is handled by the memory controller 420, the OS does not need to act on this interrupt, but may use the interrupt for telemetry collection or QoS tracking.

As shown in FIG. 4, the power management logic 440 may track memory object metadata in a table 470 or other data structure. In an example, memory object metadata may include a Domain ID, an indication of memory channel and tier, a time stamp for the last-written memory object, a medium bandwidth required by any applicable SLA, a memory object lifetime duration, a list of active memory channels and active DIMMs.

In operation, the power management logic 440 may wait until expiration of the last memory object written in a memory channel or DIMM, then deactivate that memory channel or DIMM. If there is a request to increase the amount of active memory (e.g., CPU request, OS request, expected load increase), the power management logic 440 may activate memory channels and instruct the cache agent 415 to add the activated memory channels to the memory mapping within the SAD 425.

The memory controller interfaces 430 may also provide access to power telemetry 435 that may be used to track and report the operation of the memory controller 420, such as memory region activation and deactivation.

Figure 5:
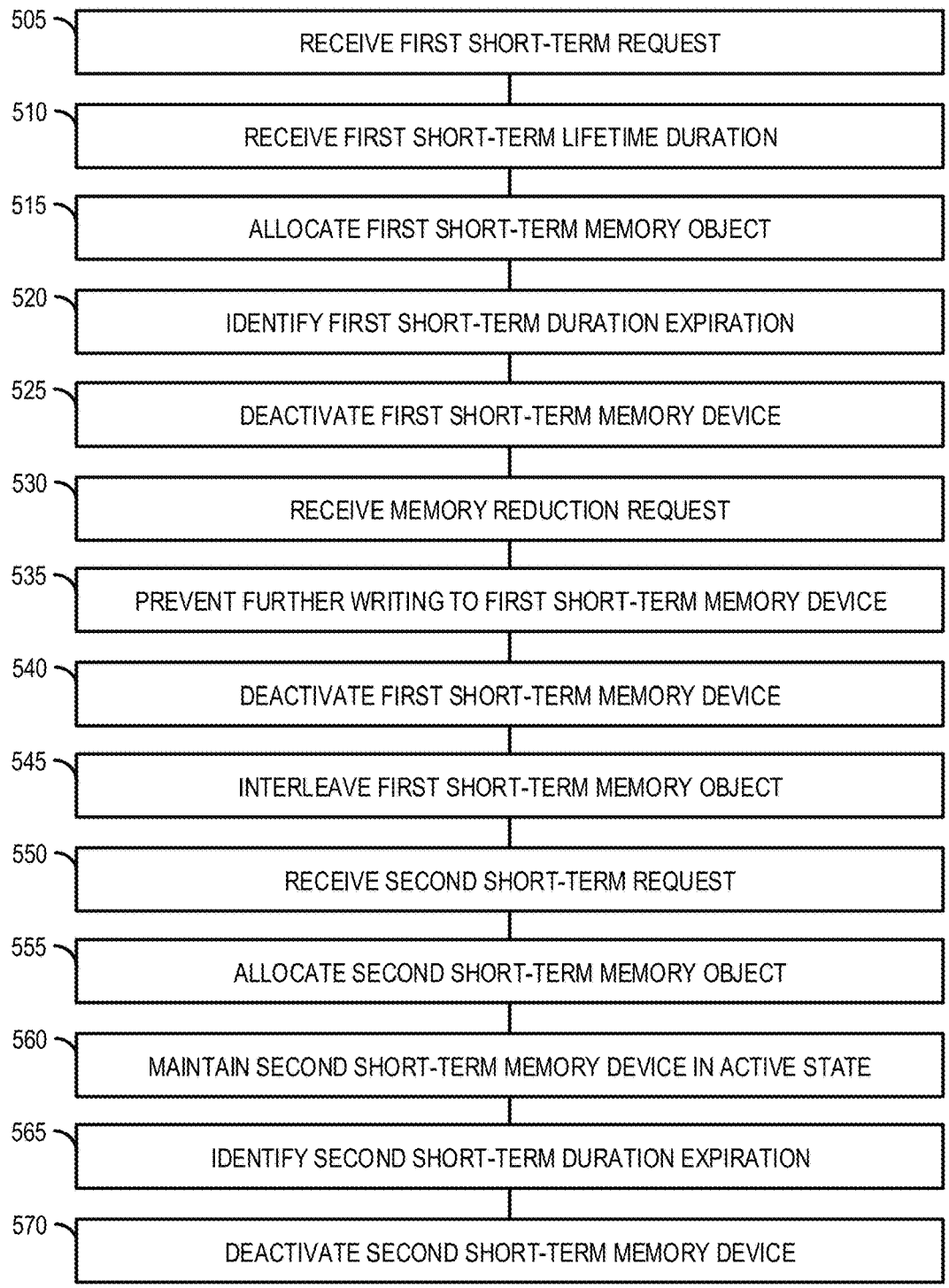
FIG. 5 is a schematic drawing illustrating a life-cycle based memory architecture method, according to an embodiment.

FIG. 5 is a schematic drawing illustrating a life-cycle based memory architecture method 500, according to an embodiment. Method 500 may include receiving 505 a first short-term request to store a first short-term memory object in a random-access memory (RAM), receiving 510 a first short-term lifetime duration associated with the first short-term memory object, and allocating 515, based on the first short-term lifetime duration, at least a portion of the first short-term memory object to a first short-term memory device within the RAM. Method 500 may include identifying 520 a first short-term duration expiration. The identification 520 of the first short-term duration expiration may occur subsequent to the allocation of the first short-term memory object to the first short-term memory device. Method 500 may include deactivating 525, responsive to the first short-term duration expiration, the first short-term memory device.

The first short-term memory device may include a first memory channel. The second short-term memory device may include a second memory channel. Each of the first memory channel and the second memory channel may be configured to be independently switchable between the active state and a deactivated state. Each of the first memory channel and the second memory channel may include a plurality of hardware memory modules, each of the plurality of hardware memory modules including a plurality of dynamic RAM integrated circuits.

Method 500 may include receiving 530 a memory reduction request. The deactivation of the first short-term memory device may be based on the receipt of the memory reduction request. The memory reduction request may be generated based on a demand activity predictor. The memory reduction request may be based on a service level, where the service level identifies a plurality of guaranteed memory regions within the RAM associated with the first short-term request. Method 500 may include preventing 535, responsive to receiving a memory reduction request, further writing to the first short-term memory device. Method 500 may include deactivating 540, responsive to a last memory object expiration, the first short-term memory device.

Method 500 may include interleaving 545 the first short-term memory object. The first short-term memory object may include a first memory sub-object and a second memory sub-object. Interleaving 545 the first short-term memory object may include allocating the first memory sub-object to the first short-term memory device and allocating the second memory sub-object to a second short-term memory device.

Method 500 may include receiving 550 a second short-term request to store a second short-term memory object in the RAM and a second short-term lifetime duration associated with the second short-term memory object. Method 500 may include allocating 555, based on the second short-term lifetime duration, the second short-term memory object to the second short-term memory device. Method 500 may include maintaining 560 the second short-term memory device in an active state when deactivating the first short-term memory device. The allocation of the first memory object to the first short-term memory device may be responsive to a determination that the first short-term lifetime duration is below a first short-term duration threshold.

Method 500 may include identifying 565 a second short-term duration expiration. The identification 565 of the second short-term duration expiration may occur subsequent to the deactivation of the first short-term memory device. Method 500 may include deactivating 570, responsive to the second short-term duration expiration, the second short-term memory device.

Figure 6A:
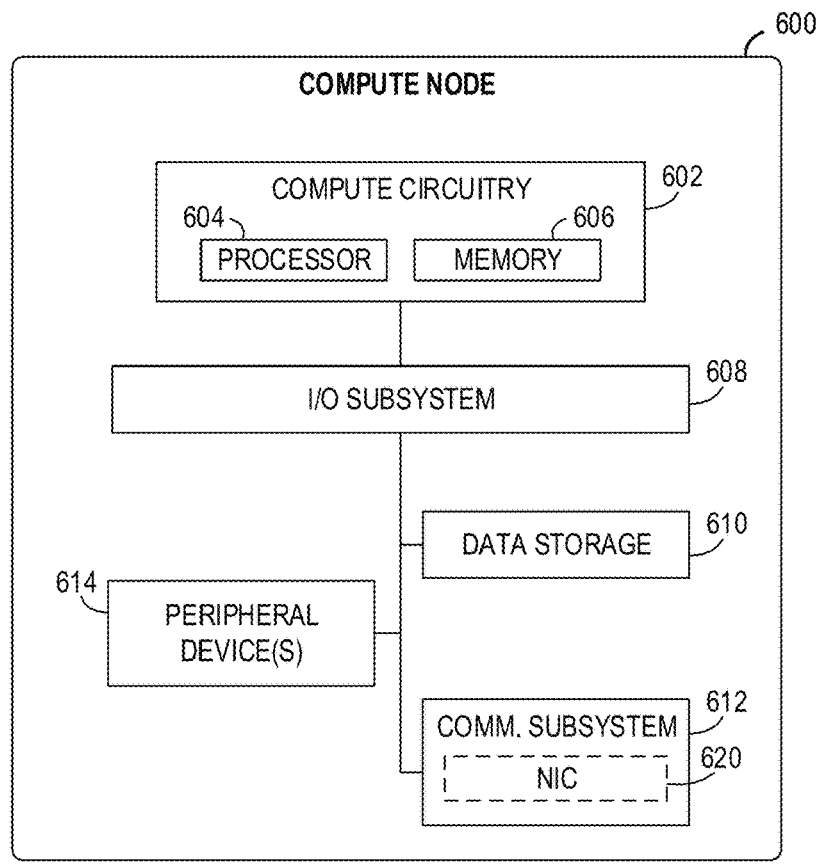
FIG. 6A provides an overview of example components within a computing device in an edge computing system, according to an embodiment.
Figure 6B:
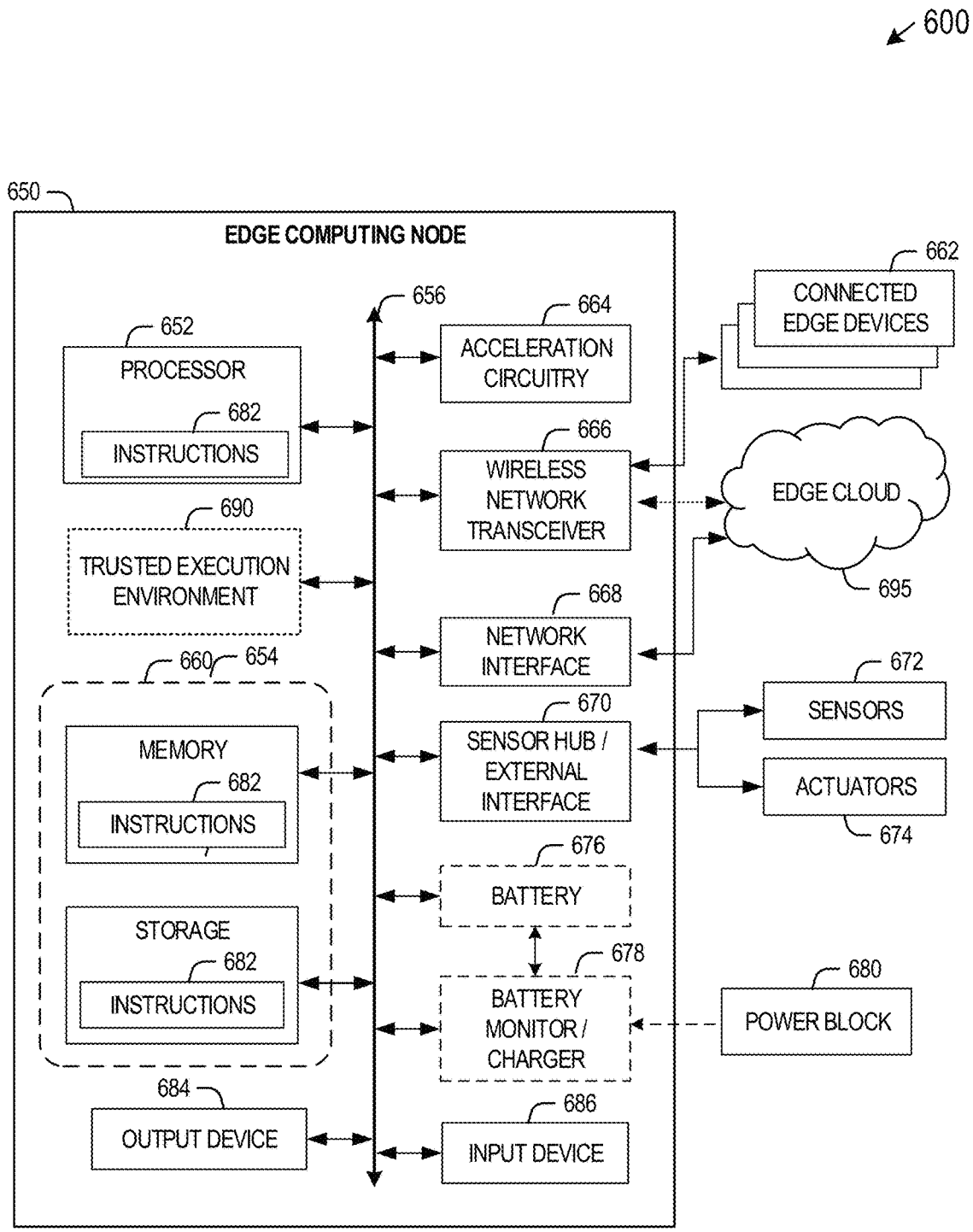
FIG. 6B provides a further overview of example components within a computing device in an edge computing system, according to an embodiment.

FIGS. 6A and 6B provide an overview of example components within a computing device in an edge computing system 600, according to an embodiment. In further examples, any of the compute nodes or devices discussed with reference to the present edge computing systems and environment may be fulfilled based on the components depicted in FIGS. 6A and 6B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 6A, an edge compute node 600 includes a compute engine (also referred to herein as "compute circuitry") 602, an input/output (I/O) subsystem 608, data storage 610, a communication circuitry subsystem 612, and, optionally, one or more peripheral devices 614. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. In some examples, the processor 604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 604 may work in coordination with each other to execute many types of operations and instructions within and on behalf of the compute node 600.

The memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 606 may be integrated into the processor 604. The memory 606 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0," set to logical "1," set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the memory 606, and other components of the compute circuitry 602, into the compute circuitry 602.

The one or more illustrative data storage devices/disks 610 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 610 may include a system partition that stores data and firmware code for the data storage device/disk 610. Individual data storage devices/disks 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway of an implementing edge computing system). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally, or alternatively, in such examples, the local memory of the NIC 620 may be integrated into one or more components of the client compute node at the board level, socket level, chip level, and/or other levels.

Additionally, in some examples, a respective compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node (whether a client, gateway, or aggregation node) in an edge computing system or like forms of appliances, computers, subsystems, circuitry, or other components.

In a more detailed example, FIG. 6B illustrates a block diagram of an example of components that may be present in an edge computing node 650 for implementing the techniques (e.g., operations, processes, methods, and methodologies) described herein. This edge computing node 650 provides a closer view of the respective components of node 600 when implemented as or as part of a computing device (e.g., as a mobile device, a base station, server, gateway, etc.). The edge computing node 650 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 650, or as components otherwise incorporated within a chassis of a larger system.

The edge computing device 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-

3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on Bluetooth Low Energy (BLE), or another low power radio, to save power. More distant connected edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in a cloud (e.g., an edge cloud 695) via local or wide area network protocols. The wireless network transceiver 666 may be a low-power wide-area (LPWA) transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 695 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 650. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 676 may power the edge computing node 650, although, in examples in which the edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the Edge computing node 650. The processor 652 may access the non-transitory, machine-readable medium 660 over the interconnect 656. For instance, the non-transitory, machine-readable medium 660 may be embodied by devices described for the storage 658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

Figure 7:
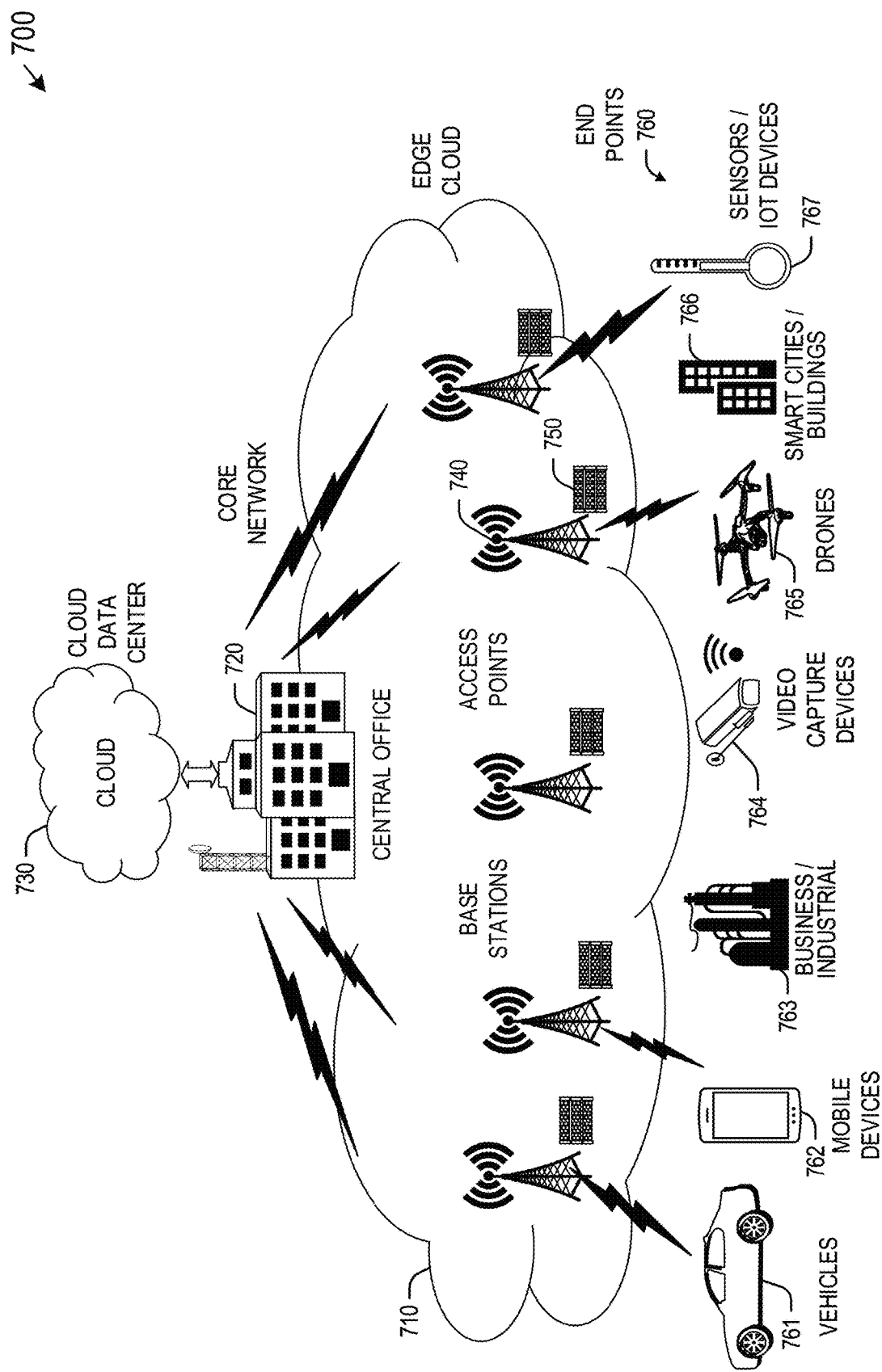
FIG. 7 is a block diagram 700 showing an overview of an Edge cloud configuration for Edge computing, according to an embodiment.

FIG. 7 is a block diagram showing an overview of an Edge cloud configuration for Edge computing, which includes a layer of processing referred to in many of the following examples as an "Edge cloud." As shown, the Edge cloud 710 is co-located at an Edge location, such as an access point or base station 740, a local processing hub 750, or a central office 720, and thus may include multiple entities, devices, and equipment instances. The Edge cloud 710 is located much closer to the endpoint (consumer and producer) data sources 760 (e.g., autonomous vehicles 761, user equipment 762, business and industrial equipment 763, video capture devices 764, drones 765, smart cities and building devices 766, sensors and IoT devices 767, etc.) than the cloud data center 730. Compute, memory, and storage resources which are offered at the edges in the Edge cloud 710 are critical to providing ultra-low latency response times for services and functions used by the endpoint data sources 760 as well as reduce network backhaul traffic from the Edge cloud 710 toward cloud data center 730 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge," "close Edge," "local Edge," "middle Edge," or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 8:
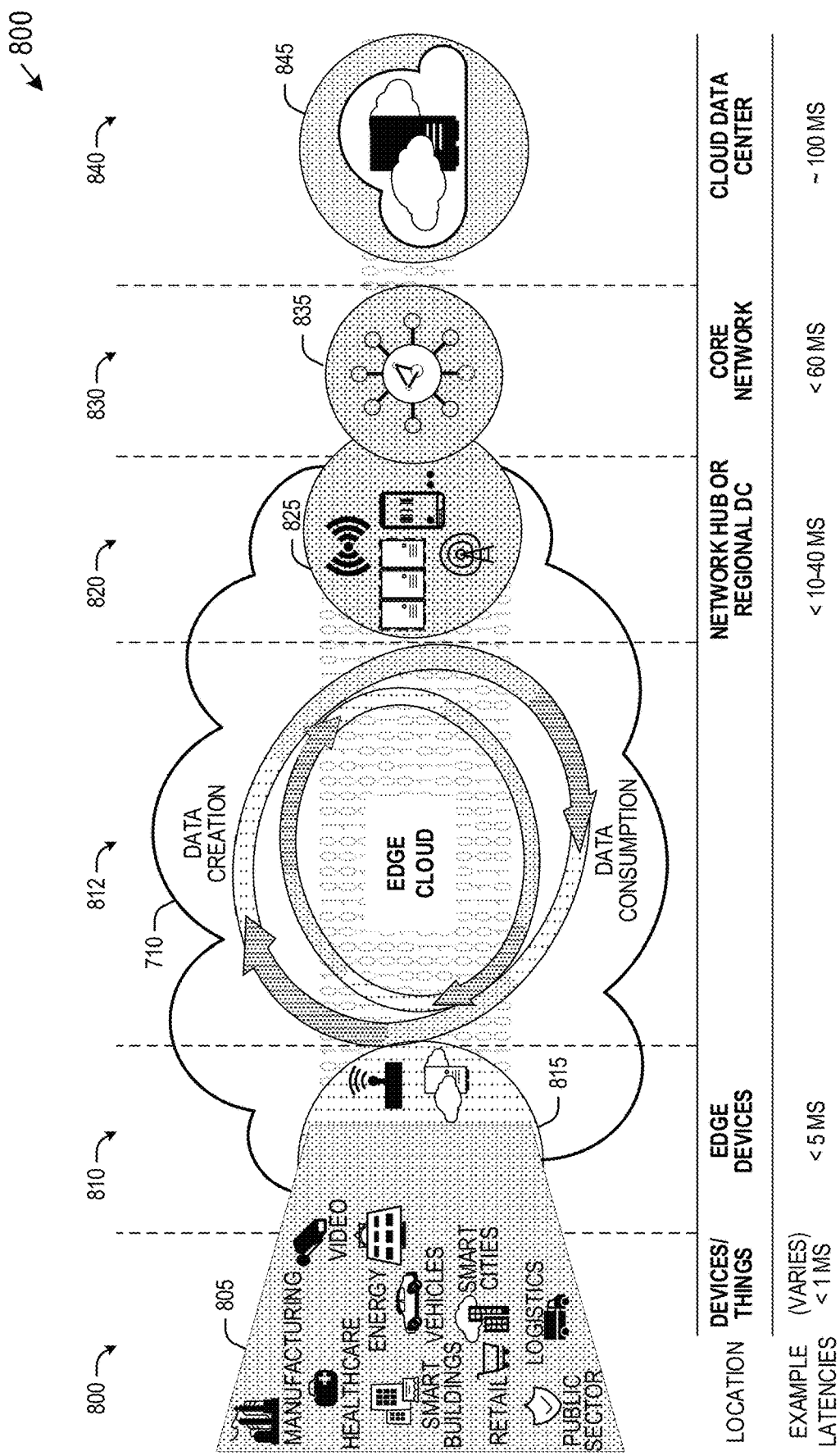
FIG. 8 illustrates operational layers among endpoints, an Edge cloud, and cloud computing environments, according to an embodiment.

FIG. 8 illustrates operational layers among endpoints, an Edge cloud, and cloud computing environments 800, according to an embodiment. Specifically, FIG. 8 depicts examples of computational use cases 805, utilizing the Edge cloud 710 among multiple illustrative layers of network computing. The layers begin at an endpoint (devices and things) layer 800, which accesses the Edge cloud 710 to conduct data creation, analysis, and data consumption activities. The Edge cloud 710 may span multiple network layers, such as an Edge devices layer 810 having gateways, on-premise servers, or network equipment (nodes 815) located in physically proximate Edge systems; a network access layer 820, encompassing base stations, radio processing units, network hubs, regional data centers (DC), or local network equipment (equipment 825); and any equipment, devices, or nodes located therebetween (in layer 812, not illustrated in detail). The network communications within the Edge cloud 710 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 800, under 5 ms at the Edge devices layer 810, to even between 10 to 40 ms when communicating with nodes at the network access layer 820. Beyond the Edge cloud 710 are core network 830 and cloud data center 840 layers, each with increasing latency (e.g., between 50-60 ms at the core network layer 830, to 100 or more ms at the cloud data center layer). As a result, operations at a core network data center 835 or a cloud data center 845, with latencies of at least 50 to 100 ms or more, will not be able to accomplish many time-critical functions of the use cases 805. Each of these latency values are provided for purposes of illustration and contrast; it will be understood that the use of other access network mediums and technologies may further reduce the latencies. In some examples, respective portions of the network may be categorized as "close Edge," "local Edge," "near Edge," "middle Edge," or "far Edge" layers, relative to a network source and destination. For instance, from the perspective of the core network data center 835 or a cloud data center 845, a central office or content data network may be considered as being located within a "near Edge" layer ("near" to the cloud, having high latency values when communicating with the devices and endpoints of the use cases 805), whereas an access point, base station, on-premise server, or network gateway may be considered as located within a "far Edge" layer ("far" from the cloud, having low latency values when communicating with the devices and endpoints of the use cases 805). It will be understood that other categorizations of a particular network layer as constituting a "close," "local," "near," "middle," or "far" Edge may be based on latency, distance, number of network hops, or other measurable characteristics, as measured from a source in any of the network layers 800-840.

The various use cases 805 may access resources under usage pressure from incoming streams, due to multiple services utilizing the Edge cloud. To achieve results with low latency, the services executed within the Edge cloud 710 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 710 may provide the ability to serve and respond to multiple applications of the use cases 805 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 710 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 710 (network layers 800-840), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco," or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 710.

As such, the Edge cloud 710 is formed from network components and functional features operated by and within Edge gateway nodes, Edge aggregation nodes, or other Edge compute nodes among network layers 810-830. The Edge cloud 710 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 710 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud 710 may be servers, multi-tenant servers, appliance computing devices, and/or any other type of computing devices. For example, the Edge cloud 710 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 6B. The Edge cloud 710 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 9:
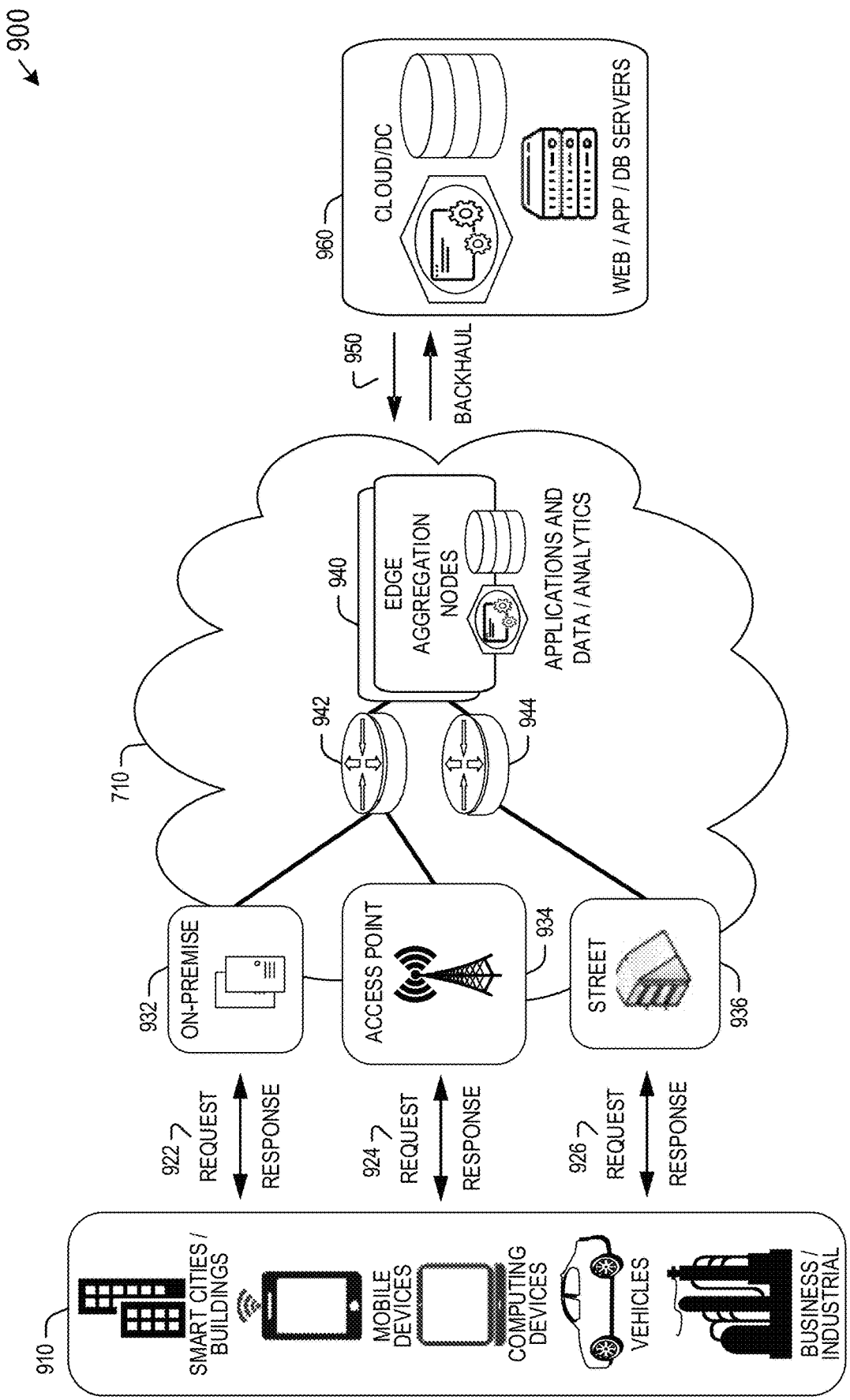
FIG. 9 illustrates an example approach for networking and services in an Edge computing system, according to an embodiment.

FIG. 9 illustrates an example approach for networking and services in an Edge computing system, according to an embodiment. In FIG. 9, various client endpoints 910 (in the form of mobile devices, computers, autonomous vehicles, business computing equipment, industrial processing equipment) exchange requests and responses that are specific to the type of endpoint network aggregation. For instance, client endpoints 910 may obtain network access via a wired broadband network, by exchanging requests and responses 922 through an on-premise network system 932. Some client endpoints 910, such as mobile computing devices, may obtain network access via a wireless broadband network, by exchanging requests and responses 924 through an access point (e.g., cellular network tower) 934. Some client endpoints 910, such as autonomous vehicles may obtain network access for requests and responses 926 via a wireless vehicular network through a street-located network system 936. However, regardless of the type of network access, the TSP may deploy aggregation points 942, 944 within the Edge cloud 710 to aggregate traffic and requests. Thus, within the Edge cloud 710, the TSP may deploy various compute and storage resources, such as at Edge aggregation nodes 940, to provide requested content. The Edge aggregation nodes 940 and other systems of the Edge cloud 710 are connected to a cloud or data center 960, which uses a backhaul network 950 to fulfill higher-latency requests from a cloud/data center for websites, applications, database servers, etc. Additional or consolidated instances of the Edge aggregation nodes 940 and the aggregation points 942, 944, including those deployed on a single server framework, may also be present within the Edge cloud 710 or other areas of the TSP infrastructure.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Example 1 is an adaptive memory scaling system, the system comprising: memory controller processing circuitry; and a memory controller memory that includes, instructions, the instructions, when executed by the memory controller processing circuitry, cause the memory controller processing circuitry to: receive a first short-term memory request to store a first short-term memory object in a random-access memory (RAM); receive a first short-term lifetime duration associated with the first short-term memory object; allocate, based on the first short-term lifetime duration, at least a portion of the first short-term memory object to a first short-term memory device within the RAM; identify, subsequent to the allocation of the first short-term memory object to the first short-term memory device, a first short-term duration expiration; and deactivate, responsive to the first short-term duration expiration, the first short-term memory device.

In Example 2, the subject matter of Example 1 includes, wherein: the first short-term duration expiration is below a short-term duration threshold; and the short-term duration threshold defines a first group of memory objects whose memory expiration times are less than expiration times of other memory object groups.

In Example 3, the subject matter of Example 2 includes, wherein the short-term duration threshold is substantially equal to 100 milliseconds.

In Example 4, the subject matter of Examples 1-3 includes, wherein the deactivation of the first short-term memory device includes at least one of causing the first short-term memory device to enter a low power mode or removing power from the first short-term memory device.

In Example 5, the subject matter of Examples 1-4 includes, the instructions further causing the memory controller processing circuitry to receive a memory reduction request, wherein the deactivation of the first short-term memory device is based on the receipt of the memory reduction request.

In Example 6, the subject matter of Example 5 includes, the instructions further causing the memory controller processing circuitry to prevent, responsive to receiving a memory reduction request, further writing to the first short-term memory device.

In Example 7, the subject matter of Example 6 includes, the instructions further causing the memory controller processing circuitry to: identify a last memory object expiration, the last memory object expiration indicating an expiration of a last memory object on the first short-term memory device; and deactivate, responsive to the last memory object expiration, the first short-term memory device.

In Example 8, the subject matter of Examples 5-7 includes, a demand activity predictor to generate a predicted memory demand based on a memory demand model, the instructions further causing the memory controller processing circuitry to generate the memory reduction request in response to the predicted memory demand.

In Example 9, the subject matter of Examples 5-8 includes, the instructions further causing the memory controller processing circuitry to generate the memory reduction request based on a service level, the service level identifying a guaranteed minimum memory size within the RAM associated with the first short-term memory request.

In Example 10, the subject matter of Examples 5-9 includes, the instructions further causing the memory controller processing circuitry to generate the memory reduction request based on a custom trigger, wherein the custom trigger includes at least one of a temperature detection indicating an ambient temperature transgressed an ambient temperature threshold, a variable change detection indicating a variable changes from a current value, a variable value detection indicating the variable changes to a predetermined variable value, or a configuration detection indicating change in a current computing system configuration.

In Example 11, the subject matter of Examples 1-10 includes, wherein the first short-term memory object includes a first memory sub-object and a second memory sub-object, the instructions further causing the memory controller processing circuitry to interleave the first short-term memory object including: allocating the first memory sub-object to the first short-term memory device; and allocating the second memory sub-object to a second short-term memory device.

In Example 12, the subject matter of Example 11 includes, the instructions further causing the memory controller processing circuitry to: receive a second short-term memory request to store a second short-term memory object in the RAM; receive a second short-term lifetime duration associated with the second short-term memory object; allocate, based on the second short-term lifetime duration, the second short-term memory object to the second short-term memory device; and maintain the second short-term memory device in an active state when deactivating the first short-term memory device.

In Example 13, the subject matter of Example 12 includes, the instructions further causing the memory controller processing circuitry to: identify, subsequent to the deactivation of the first short-term memory device, a second short-term duration expiration; and deactivate, responsive to the second short-term duration expiration, the second short-term memory device.

In Example 14, the subject matter of Examples 12-13 includes, wherein: the first short-term memory device includes a first memory channel; the second short-term memory device includes a second memory channel; and each of the first memory channel and the second memory channel are configured to be independently switchable between the active state and a deactivated state.

In Example 15, the subject matter of Example 14 includes, wherein each of the first memory channel and the second memory channel includes a plurality of hardware memory devices.

In Example 16, the subject matter of Example 15 includes, wherein the plurality of hardware memory devices includes at least one of a dynamic RAM memory device, a Compute Express Link (CXL) drive, or an over-fabric pooled memory device.

In Example 17, the subject matter of Examples 11-16 includes, the instructions further causing the memory controller processing circuitry to determine that the first short-term lifetime duration is below a first short-term duration threshold; wherein the allocation of the first memory object to the first short-term memory device is responsive to the determination that the first short-term lifetime duration is below the first short-term duration threshold.

In Example 18, the subject matter of Examples 12-17 includes, the instructions further causing the memory controller processing circuitry to: receive a long-term memory request to store a static memory object in the RAM; receive a long-term lifetime duration associated with the static memory object; allocate, based on the long-term lifetime duration, the static memory object to a static memory device within the RAM, the static memory device separate from the first short-term memory device; and maintain the static memory device in the active state when deactivating the first short-term memory device.

Example 19 is an adaptive memory scaling method comprising: receiving a first short-term memory request to store a first short-term memory object in a random-access memory (RAM); receiving a first short-term lifetime duration associated with the first short-term memory object; allocating, based on the first short-term lifetime duration, at least a portion of the first short-term memory object to a first short-term memory device within the RAM; identifying, subsequent to the allocation of the first short-term memory object to the first short-term memory device, a first short-term duration expiration; and deactivating, responsive to the first short-term duration expiration, the first short-term memory device.

In Example 20, the subject matter of Example 19 includes, wherein: the first short-term duration expiration is below a short-term duration threshold; and the short-term duration threshold defines a first group of memory objects whose memory expiration times are less than expiration times of other memory object groups.

In Example 21, the subject matter of Example 20 includes, wherein the short-term duration threshold is substantially equal to 100 milliseconds.

In Example 22, the subject matter of Examples 19-21 includes, wherein the deactivation of the first short-term memory device includes at least one of causing the first short-term memory device to enter a low power mode or removing power from the first short-term memory device.

In Example 23, the subject matter of Examples 19-22 includes, receiving a memory reduction request, wherein the deactivation of the first short-term memory device is based on the receipt of the memory reduction request.

In Example 24, the subject matter of Example 23 includes, the method further including preventing, responsive to receiving a memory reduction request, further writing to the first short-term memory device.

In Example 25, the subject matter of Example 24 includes, the method further including: identifying a last memory object expiration, the last memory object expiration indicating an expiration of a last memory object on the first short-term memory device; and deactivating, responsive to the last memory object expiration, the first short-term memory device.

In Example 26, the subject matter of Examples 23-25 includes, generating the memory reduction request based on a predicted memory demand generated at a demand activity predictor based on a memory demand model.

In Example 27, the subject matter of Examples 23-26 includes, generating the memory reduction request based on a service level, the service level identifying a guaranteed minimum memory size within the RAM associated with the first short-term memory request.

In Example 28, the subject matter of Examples 23-27 includes, generating the memory reduction request based on a custom trigger, wherein the custom trigger includes at least one of a temperature detection indicating an ambient temperature transgressed an ambient temperature threshold, a variable change detection indicating a variable changes from a current value, a variable value detection indicating the variable changes to a predetermined variable value, or a configuration detection indicating change in a current computing system configuration.

In Example 29, the subject matter of Examples 19-28 includes, wherein the first short-term memory object includes a first memory sub-object and a second memory sub-object, the method further including interleaving the first short-term memory object, the interleaving including: allocating the first memory sub-object to the first short-term memory device; and allocating the second memory sub-object to a second short-term memory device.

In Example 30, the subject matter of Example 29 includes, receiving a second short-term memory request to store a second short-term memory object in the RAM; receiving a second short-term lifetime duration associated with the second short-term memory object; allocating, based on the second short-term lifetime duration, the second short-term memory object to the second short-term memory device; and maintaining the second short-term memory device in an active state when deactivating the first short-term memory device.

In Example 31, the subject matter of Example 30 includes, identifying, subsequent to the deactivation of the first short-term memory device, a second short-term duration expiration; and deactivating, responsive to the second short-term duration expiration, the second short-term memory device.

In Example 32, the subject matter of Examples 30-31 includes, wherein: the first short-term memory device includes a first memory channel; the second short-term memory device includes a second memory channel; and each of the first memory channel and the second memory channel are configured to be independently switchable between the active state and a deactivated state.

In Example 33, the subject matter of Example 32 includes, wherein each of the first memory channel and the second memory channel includes a plurality of hardware memory devices.

In Example 34, the subject matter of Example 33 includes, wherein the plurality of hardware memory devices includes at least one of a dynamic RAM memory device, a Compute Express Link (CXL) drive, or an over-fabric pooled memory device.

In Example 35, the subject matter of Examples 29-34 includes, determining that the first short-term lifetime duration is below a first short-term duration threshold; wherein the allocation of the first memory object to the first short-term memory device is responsive to the determination that the first short-term lifetime duration is below the first short-term duration threshold.

In Example 36, the subject matter of Examples 30-35 includes, receiving a long-term memory request to store a static memory object in the RAM; receiving a long-term lifetime duration associated with the static memory object; allocating, based on the long-term lifetime duration, the static memory object to a static memory device within the RAM, the static memory device separate from the first short-term memory device; and maintaining the static memory device in the active state when deactivating the first short-term memory device.

Example 37 is at least one non-transitory machine-readable storage medium, comprising a plurality of instructions that, responsive to being executed with processor circuitry of a computer-controlled device, cause the processing circuitry to: receive a first short-term memory request to store a first short-term memory object in a random-access memory (RAM); receive a first short-term lifetime duration associated with the first short-term memory object; allocate, based on the first short-term lifetime duration, at least a portion of the first short-term memory object to a first short-term memory device within the RAM; identify, subsequent to the allocation of the first short-term memory object to the first short-term memory device, a first short-term duration expiration; and deactivate, responsive to the first short-term duration expiration, the first short-term memory device.

In Example 38, the subject matter of Example 37 includes, wherein: the first short-term duration expiration is below a short-term duration threshold; and the short-term duration threshold defines a first group of memory objects whose memory expiration times are less than expiration times of other memory object groups.

In Example 39, the subject matter of Example 38 includes, wherein the short-term duration threshold is substantially equal to 100 milliseconds.

In Example 40, the subject matter of Examples 37-39 includes, wherein the deactivation of the first short-term memory device includes at least one of causing the first short-term memory device to enter a low power mode or removing power from the first short-term memory device.

In Example 41, the subject matter of Examples 37-40 includes, the plurality of instructions further causing the processing circuitry to receive a memory reduction request, wherein the deactivation of the first short-term memory device is based on the receipt of the memory reduction request.

In Example 42, the subject matter of Example 41 includes, the plurality of instructions further causing the processing circuitry to prevent, responsive to receive a memory reduction request, further writing to the first short-term memory device.

In Example 43, the subject matter of Example 42 includes, the plurality of instructions further causing the processing circuitry to: identify a last memory object expiration, the last memory object expiration indicating an expiration of a last memory object on the first short-term memory device; and deactivate, responsive to the last memory object expiration, the first short-term memory device.

In Example 44, the subject matter of Examples 41-43 includes, the plurality of instructions further causing the processing circuitry to generate the memory reduction request based on a predicted memory demand generated at a demand activity predictor based on a memory demand model.

In Example 45, the subject matter of Examples 41-44 includes, the plurality of instructions further causing the processing circuitry to generating the memory reduction request based on a service level, the service level identify a guaranteed minimum memory size within the RAM associated with the first short-term memory request.

In Example 46, the subject matter of Examples 41-45 includes, the plurality of instructions further causing the processing circuitry to generate the memory reduction request based on a custom trigger.

In Example 47, the subject matter of Example 46 includes, wherein the custom trigger includes at least one of a temperature detection indicating an ambient temperature transgressed an ambient temperature threshold, a variable change detection indicating a variable changes from a current value, a variable value detection indicating the variable changes to a predetermined variable value, or a configuration detection indicating change in a current computing system configuration.

In Example 48, the subject matter of Examples 37-47 includes, wherein the first short-term memory object includes a first memory sub-object and a second memory sub-object, the plurality of instructions further causing the processing circuitry to interleave the first short-term memory object, the interleaving including: allocating the first memory sub-object to the first short-term memory device; and allocating the second memory sub-object to a second short-term memory device.

In Example 49, the subject matter of Example 48 includes, the plurality of instructions further causing the processing circuitry to: receive a second short-term memory request to store a second short-term memory object in the RAM; receive a second short-term lifetime duration associated with the second short-term memory object; allocate, based on the second short-term lifetime duration, the second short-term memory object to the second short-term memory device; and maintain the second short-term memory device in an active state when deactivating the first short-term memory device.

In Example 50, the subject matter of Example 49 includes, the plurality of instructions further causing the processing circuitry to: identify, subsequent to the deactivation of the first short-term memory device, a second short-term duration expiration; and deactivate, responsive to the second short-term duration expiration, the second short-term memory device.

In Example 51, the subject matter of Examples 49-50 includes, wherein: the first short-term memory device includes a first memory channel; the second short-term memory device includes a second memory channel; and each of the first memory channel and the second memory channel are configured to be independently switchable between the active state and a deactivated state.

In Example 52, the subject matter of Example 51 includes, wherein each of the first memory channel and the second memory channel includes a plurality of hardware memory devices.

In Example 53, the subject matter of Example 52 includes, wherein the plurality of hardware memory devices includes at least one of a dynamic RAM memory device, a Compute Express Link (CXL) drive, or an over-fabric pooled memory device.

In Example 54, the subject matter of Examples 48-53 includes, the plurality of instructions further causing the processing circuitry to determine that the first short-term lifetime duration is below a first short-term duration threshold; wherein the allocation of the first memory object to the first short-term memory device is responsive to the determination that the first short-term lifetime duration is below the first short-term duration threshold.

In Example 55, the subject matter of Examples 49-54 includes, the plurality of instructions further causing the processing circuitry to: receive a long-term memory request to store a static memory object in the RAM; receive a long-term lifetime duration associated with the static memory object; allocate, based on the long-term lifetime duration, the static memory object to a static memory device within the RAM, the static memory device separate from the first short-term memory device; and maintain the static memory device in the active state when deactivating the first short-term memory device.

Example 56 is an edge computing system, comprising a plurality of edge computing nodes, the plurality of edge computing nodes configured with the biometric security methods of any of the Examples 1-55.

Example 57 is an edge computing node, operable in an edge computing system, comprising processing circuitry configured to implement any of the Examples 1-55.

Example 58 is an edge computing node, operable as a server in an edge computing system, configured to perform any of the Examples 1-55.

Example 59 is an edge computing node, operable as a client in an edge computing system, configured to perform any of the Examples 1-55.

Example 60 is an edge computing node, operable in a layer of an edge computing network as an aggregation node, network hub node, gateway node, or core data processing node, configured to perform any of the Examples 1-55.

Example 61 is an edge computing network, comprising networking and processing components configured to provide or operate a communications network, to enable an edge computing system to implement any of the Examples 1-55.

Example 62 is an access point, comprising networking and processing components configured to provide or operate a communications network, to enable an edge computing system to implement any of the Examples 1-55.

Example 63 is a base station, comprising networking and processing components configured to provide or operate a communications network, to enable an edge computing system to implement any of the Examples 1-55.

Example 64 is a road-side unit, comprising networking components configured to provide or operate a communications network, to enable an edge computing system to implement any of the Examples 1-55.

Example 65 is an on-premise server, operable in a private communications network distinct from a public edge computing network, the server configured to enable an edge computing system to implement any of the Examples 1-55.

Example 66 is a 3GPP 4G/LTE mobile wireless communications system, comprising networking and processing components configured with the biometric security methods of any of the Examples 1-55.

Example 67 is a 5G network mobile wireless communications system, comprising networking and processing components configured with the biometric security methods of any of the Examples 1-55.

Example 68 is a user equipment device, comprising networking and processing circuitry, configured to connect with an edge computing system configured to implement any of the Examples 1-55.

Example 69 is a client computing device, comprising processing circuitry, configured to coordinate compute operations with an edge computing system, the edge computing system configured to implement any of the Examples 1-55.

Example 70 is an edge provisioning node, operable in an edge computing system, configured to implement any of the Examples 1-55.

Example 71 is a service orchestration node, operable in an edge computing system, configured to implement any of the Examples 1-55.

Example 72 is an application orchestration node, operable in an edge computing system, configured to implement any of the Examples 1-55.

Example 73 is a multi-tenant management node, operable in an edge computing system, configured to implement any of the Examples 1-55.

Example 74 is an edge computing system comprising processing circuitry, the edge computing system configured to operate one or more functions and services to implement any of the Examples 1-55.

Example 75 is a networking hardware with network functions implemented thereupon, operable within an edge computing system configured with the biometric security methods of any of Examples 1-55.

Example 76 is acceleration hardware with acceleration functions implemented thereupon, operable in an edge computing system, the acceleration functions configured to implement any of the Examples 1-55.

Example 77 is a storage hardware with storage capabilities implemented thereupon, operable in an edge computing system, the storage hardware configured to implement any of the Examples 1-55.

Example 78 is a computation hardware with compute capabilities implemented thereupon, operable in an edge computing system, the computation hardware configured to implement any of the Examples 1-55.

Example 79 is an edge computing system adapted for supporting vehicle-to-vehicle (V2V), vehicle-to-everything (V2X), or vehicle-to-infrastructure (V2I) scenarios, configured to implement any of the Examples 1-55.

Example 80 is an edge computing system adapted for operating according to one or more European Telecommunications Standards Institute (ETSI) Multi-Access Edge Computing (MEC) specifications, the edge computing system configured to implement any of the Examples 1-55.

Example 81 is an edge computing system adapted for operating one or more multi-access edge computing (MEC) components, the MEC components provided from one or more of: a MEC proxy, a MEC application orchestrator, a MEC application, a MEC platform, or a MEC service, according to an European Telecommunications Standards Institute (ETSI) Multi-Access Edge Computing (MEC) configuration, the MEC components configured to implement any of the Examples 1-55.

Example 82 is an edge computing system configured as an edge mesh, provided with a microservice cluster, a microservice cluster with sidecars, or linked microservice clusters with sidecars, configured to implement any of the Examples 1-55.

Example 83 is an edge computing system, comprising circuitry configured to implement one or more isolation environments provided among dedicated hardware, virtual machines, containers, virtual machines on containers, configured to implement any of the Examples 1-55.

Example 84 is an edge computing server, configured for operation as an enterprise server, roadside server, street cabinet server, or telecommunications server, configured to implement any of the Examples 1-55.

Example 85 is an edge computing system configured to implement any of the Examples 1-55 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 86 is an edge computing system, comprising computing nodes operated by multiple owners at different geographic locations, configured to implement any of the Examples 1-55.

Example 87 is a cloud computing system, comprising data servers operating respective cloud services, the respective cloud services configured to coordinate with an edge computing system to implement any of the Examples 1-55.

Example 88 is a server, comprising hardware to operate cloudlet, edgelet, or applet services, the services configured to coordinate with an edge computing system to implement any of the Examples 1-55.

Example 89 is an edge node in an edge computing system, comprising one or more devices with at least one processor and memory to implement any of the Examples 1-55.

Example 90 is an edge node in an edge computing system, the edge node operating one or more services provided from among: a management console service, a telemetry service, a provisioning service, an application or service orchestration service, a virtual machine service, a container service, a function deployment service, or a compute deployment service, or an acceleration management service, the one or more services configured to implement any of the Examples 1-55.

Example 91 is a set of distributed edge nodes, distributed among a network layer of an edge computing system, the network layer comprising a close edge, local edge, enterprise edge, on-premise edge, near edge, middle, edge, or far edge network layer, configured to implement any of the Examples 1-55.

Example 92 is an apparatus of an edge computing system comprising: one or more processors and one or more computer-readable media comprising instructions that, when executed by the one or more processors, cause the one or more processors to perform any of the Examples 1-55.

Example 93 is one or more computer-readable storage media comprising instructions to cause an electronic device of an edge computing system, upon execution of the instructions by one or more processors of the electronic device, to perform any of the Examples 1-55.

Example 94 is a communication signal communicated in an edge computing system, to perform any of the Examples 1-55.

Example 95 is a data structure communicated in an edge computing system, the data structure comprising a datagram, packet, frame, segment, protocol data unit (PDU), or message, to perform any of the Examples 1-55.

Example 96 is a signal communicated in an edge computing system, the signal encoded with a datagram, packet, frame, segment, protocol data unit (PDU), message, or data to perform any of the Examples 1-55.

Example 97 is an electromagnetic signal communicated in an edge computing system, the electromagnetic signal carrying computer-readable instructions, wherein execution of the computer-readable instructions by one or more processors causes the one or more processors to perform any of the Examples 1-55.

Example 98 is a computer program used in an edge computing system, the computer program comprising instructions, wherein execution of the program by a processing element in the edge computing system is to cause the processing element to perform any of the Examples 1-55.

Example 99 is an apparatus of an edge computing system comprising means to perform any of the Examples 1-55.

Example 100 is an apparatus of an edge computing system comprising logic, modules, or circuitry to perform any of the Examples 1-55.

Example 101 is at least one machine-readable medium including instructions that, when executed by processing circuitry, cause the processing circuitry to perform operations to implement of any of Examples 1-100.

Example 102 is an apparatus comprising means to implement of any of Examples 1-100.

Example 103 is a system to implement of any of Examples 1-100.

Example 104 is a method to implement of any of Examples 1-100.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An adaptive memory scaling method comprising:
    receiving a first short-term memory request to store a first short-term memory object in a random-access memory (RAM);
    receiving a first short-term lifetime duration associated with the first short-term memory object;
    allocating, based on the first short-term lifetime duration, at least a portion of the first short-term memory object to a first short-term memory device within the RAM;
    identifying, subsequent to the allocation of the at least a portion of the first short-term memory object to the first short-term memory device, a first short-term duration expiration; and
    deactivating, responsive to the first short-term duration expiration, the first short-term memory device.

2. The method of claim 1, wherein the deactivation of the first short-term memory device includes at least one of causing the first short-term memory device to enter a low power mode or removing power from the first short-term memory device.

3. The method of claim 1, further including receiving a memory reduction request, wherein the deactivation of the first short-term memory device is based on the receiving of the memory reduction request.

4. The method of claim 3, the method further including preventing, responsive to receiving a memory reduction request, further writing to the first short-term memory device.

5. The method of claim 4, the method further including;
    identifying a last memory object expiration, the last memory object expiration indicating an expiration of a last memory object on the first short-term memory device; and
    deactivating, responsive to the last memory object expiration, the first short-term memory device.

6. The method of claim 3, further including generating the memory reduction request based on a service level, the service level identifying a guaranteed minimum memory size within the RAM associated with the first short-term memory request.

7. The method of claim 3, further including generating the memory reduction request based on a custom trigger, wherein the custom trigger includes at least one of a temperature detection indicating an ambient temperature transgressed an ambient temperature threshold, a variable change detection indicating a variable changes from a current value, a variable value detection indicating the variable changes to a predetermined variable value, or a configuration detection indicating change in a current computing system configuration.

8. The method of claim 1, wherein the first short-term memory object includes a first memory sub-object and a second memory sub-object, the method further including interleaving the first short-term memory object, the interleaving including:
    allocating the first memory sub-object to the first short-term memory device; and
    allocating the second memory sub-object to a second short-term memory device.

9. The method of claim 8, further including:
    receiving a second short-term memory request to store a second short-term memory object in the RAM;
    receiving a second short-term lifetime duration associated with the second short-term memory object;
    allocating, based on the second short-term lifetime duration, the second short-term memory object to the second short-term memory device; and
    maintaining the second short-term memory device in an active state when deactivating the first short-term memory device.

10. The method of claim 8, further including determining that the first short-term lifetime duration is below a first short-term duration threshold;
    wherein the allocation of the first memory object to the first short-term memory device is responsive to the determination that the first short-term lifetime duration is below the first short-term duration threshold.

11. An adaptive memory scaling system, the system comprising:
    memory controller processing circuitry; and
    a memory controller memory that includes instructions, the instructions, when executed by the memory controller processing circuitry, cause the memory controller processing circuitry to:
    receive a first short-term memory request to store a first short-term memory object in a random-access memory (RAM);
    receive a first short-term lifetime duration associated with the first short-term memory object;
    allocate, based on the first short-term lifetime duration, at least a portion of the first short-term memory object to a first short-term memory device within the RAM;
    identify, subsequent to the allocation of the at least a portion of the first short-term memory object to the first short-term memory device, an expiration of a first short-term duration; and
    deactivate, responsive to the expiration of the first short-term duration expiration, the first short-term memory device by powering down the first short-term memory device.

12. The system of claim 11, wherein:
    the first short-term duration expiration is below a short-term duration threshold; and
    the short-term duration threshold defines a first group of memory objects whose memory expiration times are less than expiration times of other memory object groups.

13. The system of claim 11, the instructions further causing the memory controller processing circuitry to receive a memory reduction request, wherein the deactivation of the first short-term memory device is based on the receipt receiving of the memory reduction request.

14. The system of claim 13, the instructions further causing the memory controller processing circuitry to prevent, responsive to receiving a memory reduction request, further writing to the first short-term memory device.

15. The system of claim 14, the instructions further causing the memory controller processing circuitry to:
identify a last memory object expiration, the last memory object expiration indicating an expiration of a last memory object on the first short-term memory device; and
deactivate, responsive to the last memory object expiration, the first short-term memory device.

16. The system of claim 13, further including a demand activity predictor to generate a predicted memory demand based on a memory demand model, the instructions further causing the memory controller processing circuitry to generate the memory reduction request in response to the predicted memory demand.

17. The system of claim 13, the instructions further causing the memory controller processing circuitry to generate the memory reduction request based on a service level, the service level identifying a guaranteed minimum memory size within the RAM associated with the first short-term memory request.

18. The system of claim 11, wherein the first short-term memory object includes a first memory sub-object and a second memory sub-object, the instructions further causing the memory controller processing circuitry to interleave the first short-term memory object including:
allocating the first memory sub-object to the first short-term memory device; and
allocating the second memory sub-object to a second short-term memory device.

19. The system of claim 18, the instructions further causing the memory controller processing circuitry to:
receive a second short-term memory request to store a second short-term memory object in the RAM;
receive a second short-term lifetime duration associated with the second short-term memory object;
allocate, based on the second short-term lifetime duration, the second short-term memory object to the second short-term memory device; and
maintain the second short-term memory device in an active state when deactivating the first short-term memory device.

20. The system of claim 19, wherein:
the first short-term memory device includes a first memory channel;
the second short-term memory device includes a second memory channel; and
each of the first memory channel and the second memory channel are configured to be independently switchable between the active state and a deactivated state.

21. The system of claim 18, the instructions further causing the memory controller processing circuitry to determine that the first short-term lifetime duration is below a first short-term duration threshold;
wherein the allocation of the first memory object to the first short-term memory device is responsive to the determination that the first short-term lifetime duration is below the first short-term duration threshold.

22. At least one non-transitory machine-readable storage medium, comprising a plurality of instructions that, responsive to being executed with processor processing circuitry of a computer-controlled device, cause the processing circuitry to:
receive a first short-term memory request to store a first short-term memory object in a random-access memory (RAM);
receive a first short-term lifetime duration associated with the first short-term memory object;
allocate, based on the first short-term lifetime duration, at least a portion of the first short-term memory object to a first short-term memory device within the RAM;
identify, subsequent to the allocation of the at least a portion of the first short-term memory object to the first short-term memory device, a first short-term duration expiration; and
deactivate, responsive to the first short-term duration expiration, the first short-term memory device.

23. The non-transitory machine-readable storage medium of claim 22, the plurality of instructions further causing the processing circuitry to receive a memory reduction request, wherein the deactivation of the first short-term memory device is based on the receipt receiving of the memory reduction request.

24. The non-transitory machine-readable storage medium of claim 23, the plurality of instructions further causing the processing circuitry to prevent, responsive to receive a memory reduction request, further writing to the first short-term memory device.

25. The non-transitory machine-readable storage medium of claim 24, the plurality of instructions further causing the processing circuitry to:
identify a last memory object expiration, the last memory object expiration indicating an expiration of a last memory object on the first short-term memory device; and
deactivate, responsive to the last memory object expiration, the first short-term memory device.

* * * * *